(12) United States Patent
Bahr et al.

(10) Patent No.: US 10,131,027 B2
(45) Date of Patent: Nov. 20, 2018

(54) PROJECTED SCALE FOR DEPTH MEASUREMENT

(71) Applicant: HILTI AKTIENGESELLSCHAFT, Schaan (LI)

(72) Inventors: Dominik Bahr, Hohenpeissenberg (DE); Martin Zacher, Calw (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 82 days.

(21) Appl. No.: 15/502,605

(22) PCT Filed: Sep. 23, 2015

(86) PCT No.: PCT/EP2015/071829
§ 371 (c)(1),
(2) Date: Feb. 8, 2017

(87) PCT Pub. No.: WO2016/062491
PCT Pub. Date: Apr. 28, 2016

(65) Prior Publication Data
US 2017/0225284 A1    Aug. 10, 2017

(30) Foreign Application Priority Data
Oct. 23, 2014   (EP) .................................... 14190026

(51) Int. Cl.
*G01N 21/00*    (2006.01)
*B23Q 17/24*    (2006.01)
(Continued)

(52) U.S. Cl.
CPC ..... *B23Q 17/2428* (2013.01); *B23Q 17/2404* (2013.01); *B25H 1/0092* (2013.01); *G01B 11/22* (2013.01)

(58) Field of Classification Search
CPC ............ B23Q 17/2428; B23Q 17/2404; B23Q 17/24; B23Q 49/00; B25H 1/0092; G01B 11/22; B23B 49/008
(Continued)

(56) References Cited

U.S. PATENT DOCUMENTS 6,565,227 B1 * 5/2003 Davis ...................... B25F 5/021
                                                    362/119
6,692,200 B2 * 2/2004 Peterson .............. B25H 1/0092
                                                    362/119
(Continued)

FOREIGN PATENT DOCUMENTS

DE    10 2004 024990 A1   12/2005
EP       1 464 428 A1     10/2004
GB       2 453 621 A       4/2009

OTHER PUBLICATIONS

International Bureau, International Search Report in International Patent Application No. PCT/EP2015/071829, dated Dec. 1, 2015.
(Continued)

*Primary Examiner* — Hoa Pham
(74) *Attorney, Agent, or Firm* — Leydig Voit & Mayer

(57) ABSTRACT

A device for determining a penetration depth in a drilled hole which is drilled into a workpiece (W) from a workpiece surface (WO) with a drill of a drilling machine. The device contains at least one light source for projecting a light field is provided onto a workpiece (W) to be processed by the drilling machine. The light source is positioned with respect to the drilling machine in such a way that a center axis (L) of the light source runs at an angle (a) with respect to a central axis (L) of the drilling machine, and at least a first blocking element for partially covering the light source is provided, said blocking element forming a reference on the light field.

8 Claims, 10 Drawing Sheets

(51) Int. Cl.
*B25H 1/00* (2006.01)
*G01B 11/22* (2006.01)

(58) Field of Classification Search
USPC .......... 356/237.1–237.6, 625–635, 614–624; 33/286, 227, 263, 278–280, 626, 642, 638
See application file for complete search history.

(56) References Cited

U.S. PATENT DOCUMENTS

| | | | |
|---|---|---|---|
| 7,200,516 B1* | 4/2007 | Cowley | B23B 49/00 356/138 |
| 8,810,802 B2* | 8/2014 | Schmidt | B25F 5/021 356/614 |
| 9,114,494 B1* | 8/2015 | Mah | B23Q 17/2233 |
| 2004/0093749 A1* | 5/2004 | Wu | B25H 1/0092 33/286 |
| 2005/0261870 A1 | 11/2005 | Cramer et al. | |
| 2016/0128704 A1* | 5/2016 | McGinley | A61B 17/15 606/80 |
| 2017/0231644 A1* | 8/2017 | Anderson | A61B 17/1624 606/80 |

OTHER PUBLICATIONS

European Patent Office, European Search Report in European Patent Application No. 14190026.6, dated Mar. 30, 2015.

\* cited by examiner

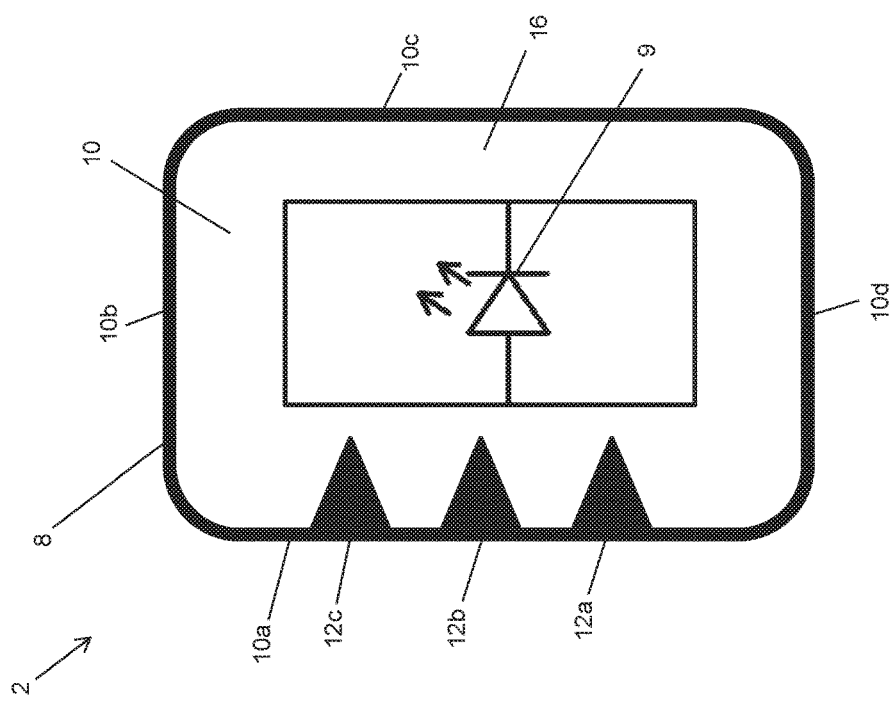
Fig. 3
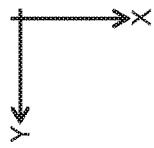

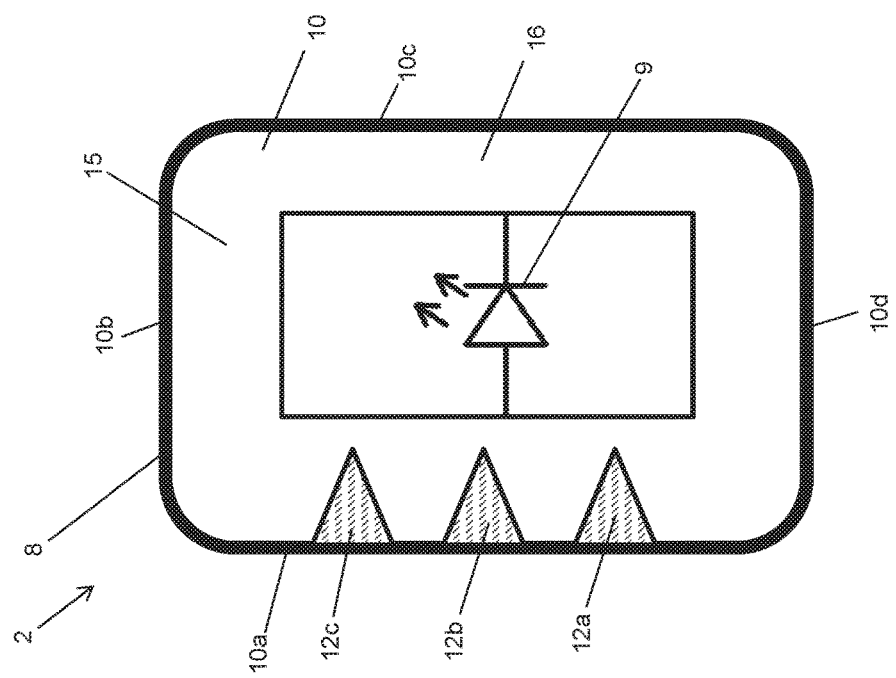
Fig. 4
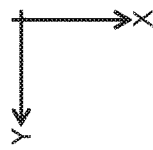

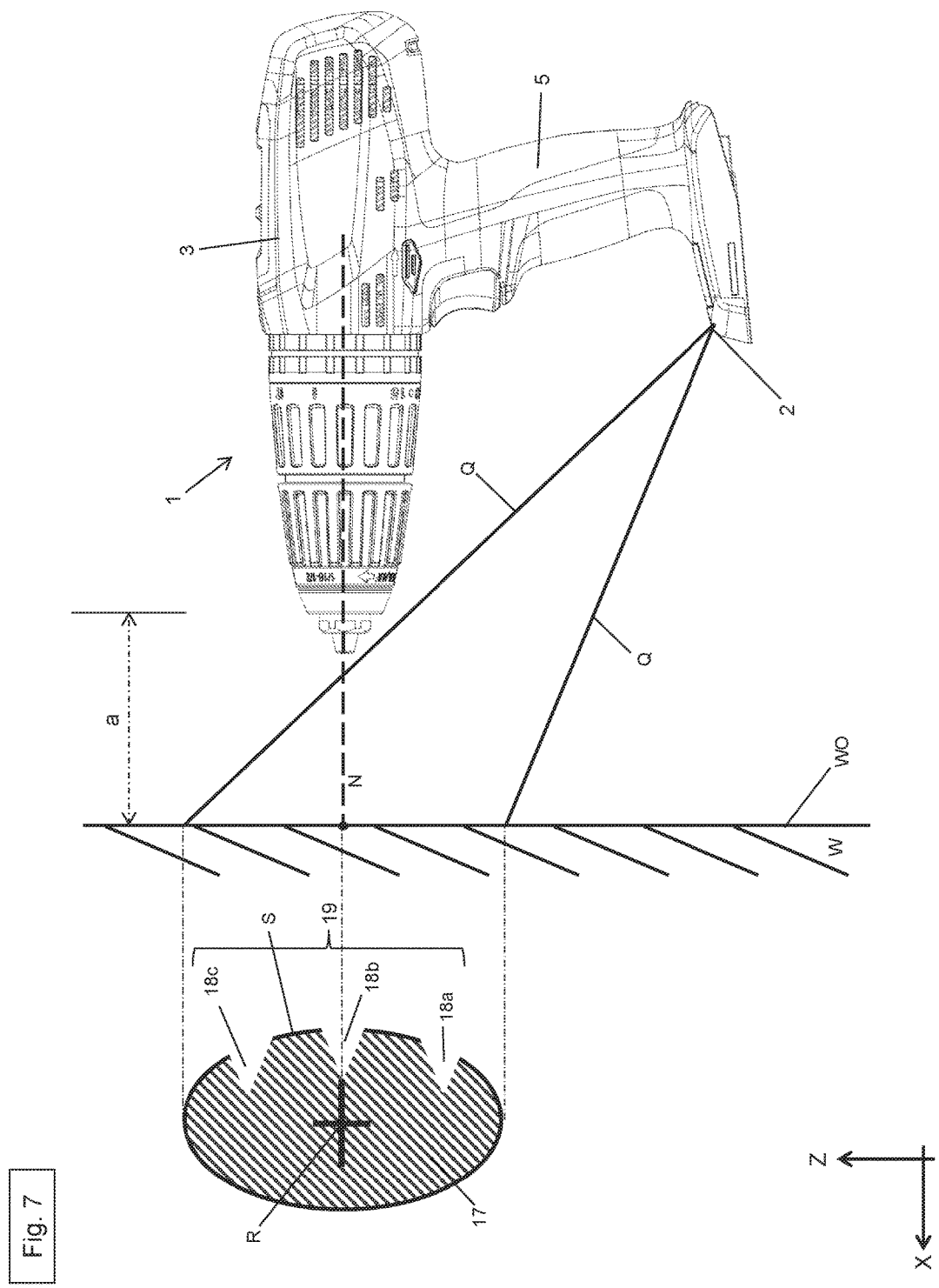

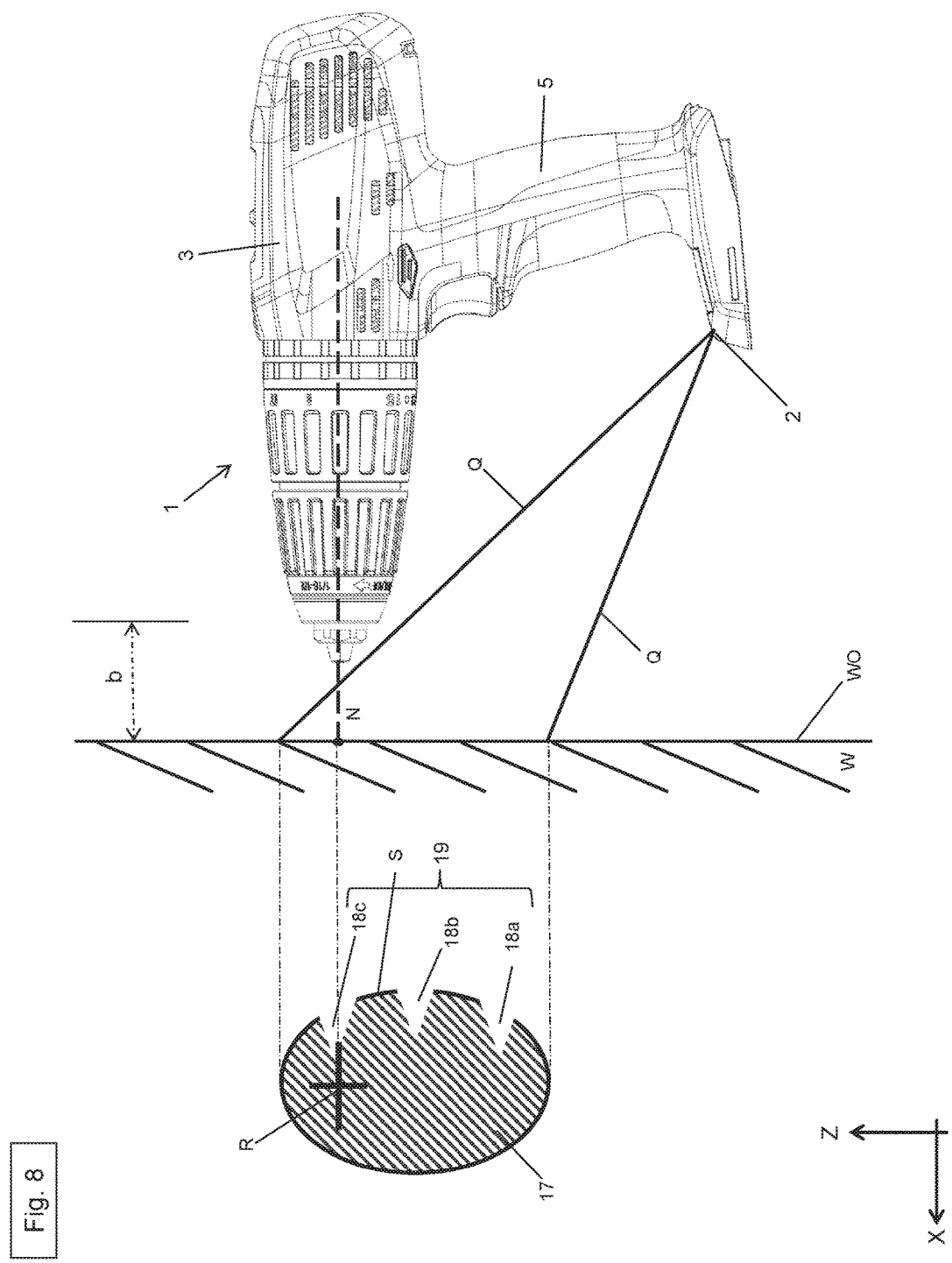

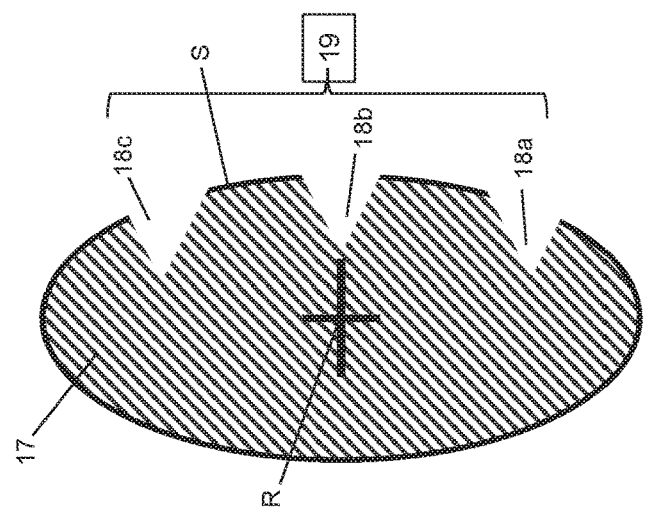
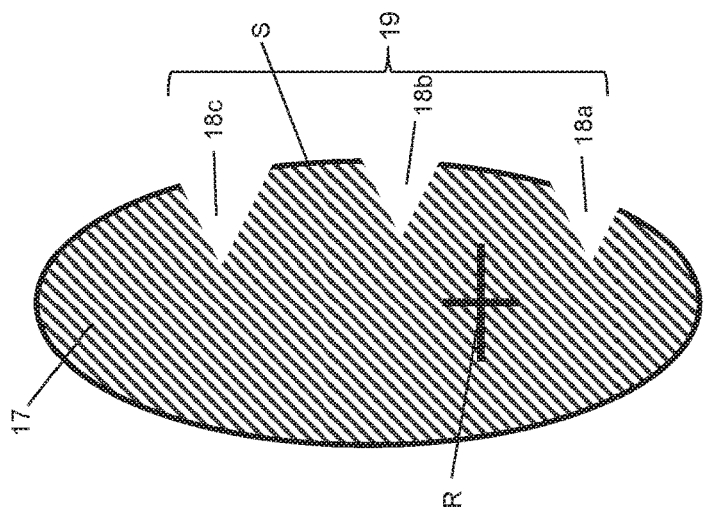
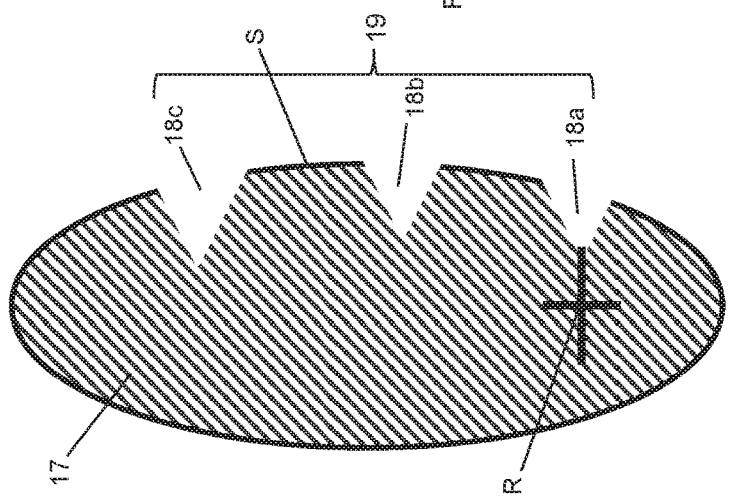
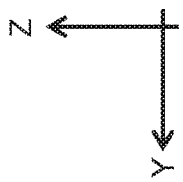

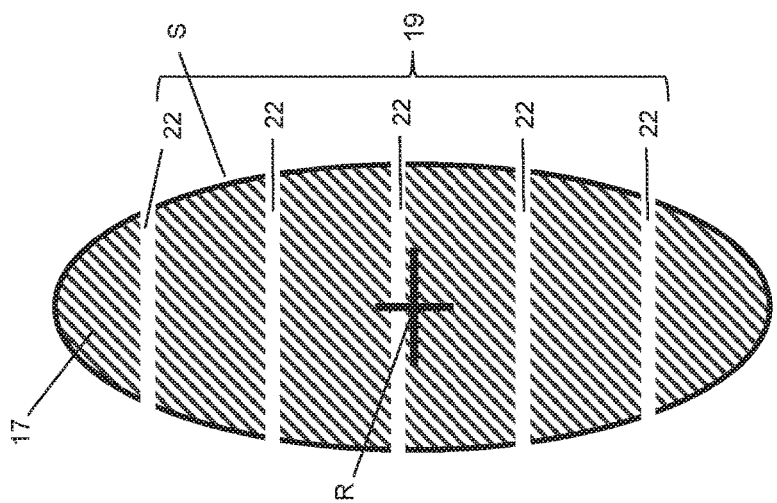
Fig. 14
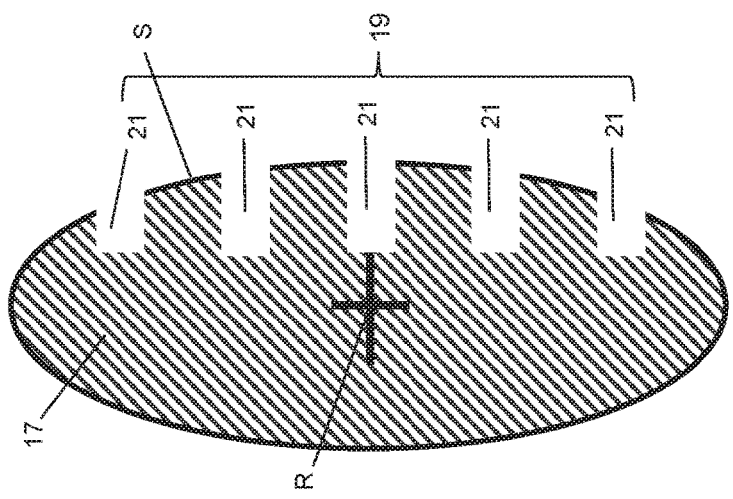
Fig. 13
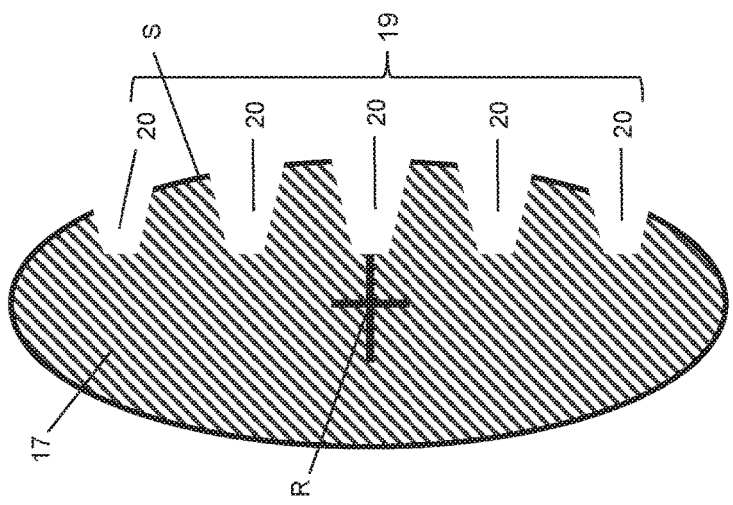
Fig. 12
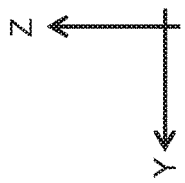

US 10,131,027 B2

PROJECTED SCALE FOR DEPTH MEASUREMENT

CROSS-REFERENCE TO RELATED APPLICATIONS

This patent application is the U.S. National Stage of International Patent Application No. PCT/EP2015/071829, filed Sep. 23, 2015, which claims the benefit of European Patent Application No. 14190026.6, filed Oct. 23, 2014, which are each incorporated by reference.

The present invention relates to a device for determining a penetration depth in a drilled hole which is drilled into a workpiece from a workpiece surface with a drill of a drilling machine, said device containing at least one light source for projecting a light field, for example, on a workpiece to be processed by the drilling machine.

BACKGROUND OF THE INVENTION

Devices for determining a penetration depth of a drill into a workpiece to be processed are widely used and known according to the prior art.

Such devices can be configured relatively simply, for example, in the form of a straightedge which is adjustable in length and is arranged parallel to the drill of the drilling machine.

Furthermore, devices for determining a penetration depth can also have a more complex configuration, as is explained below.

According to the prior art a device is known, for example, in which two laser light sources are positioned on a drilling machine at an angle relative to one another and emit two convergent light beams from the drilling machine in the direction of a workpiece surface. The two light beams are discernible as two circles of light on the workpiece surface. The two circles of light move towards one another on the workpiece surface when the drilling machine is moved in the direction of the workpiece surface. In this case the two laser light sources are adjustable relative to one another so that, when the two circles of light overlap, the user receives an indication of a specific distance of the drilling machine from the workpiece surface or a penetration depth of the drill into the workpiece. Such a device for determining a penetration depth is disclosed in the European patent document EP 1 464 428 B1.

Furthermore, a penetration depth determination device on a drilling machine is known according to the prior art, which device comprises a measuring unit with a light-emitting diode and a light sensor unit. In this case the light sensor unit contains two sensors. In this device a light beam is emitted by the light-emitting diode and is reflected by the workpiece surface. The light sensor serves for sensing light which is emitted by the light-emitting diode and is reflected by the workpiece surface. The ratio of the light intensities detected by the two sensors of the light sensor unit is determined by the angle of reflection of the sensed light component on the workpiece surface. The angle of reflection in turn is determined by the distance of the measuring unit or, respectively, the drilling machine from the workpiece surface. The penetration depth into the workpiece can be determined by the ascertained distance of the measuring unit or, respectively, the drilling machine from the workpiece. Such a device for determining a penetration depth is disclosed in the German patent application DE 10 2004 024 990 A1.

The devices described above for determining a penetration depth according to the prior art have relatively complex construction and handling. Because of this complexity, incorrect use of these devices can frequently occur. Furthermore, due to their complexity these devices are susceptible to malfunction, difficult to maintain and expensive.

BRIEF SUMMARY OF THE INVENTION

The object of the present invention, therefore, is to provide a device for determining a penetration depth in a drilled hole which is drilled into a workpiece from a workpiece surface with a drill of a drilling machine, which device ensures less complex construction and simpler handling by comparison with the prior art.

This object is achieved according to the invention by the subject of the independent claim 1. Further embodiments of the subject matter according to the invention can be found in the dependent sub-claims.

A device is provided for determining a penetration depth in a drilled hole which is drilled into a workpiece from a workpiece surface with a drill of a drilling machine, said device containing at least one light source for projecting a light field, for example, on a workpiece to be processed by the drilling machine.

According to the invention the light source is positioned with respect to the drilling machine so that a central axis of the light source extends at an angle to a central axis of the drilling machine extends and at least one first blocking element is provided for partially covering the light source and generates a scaling means on the light field. Because the central axis of the light source does not extend parallel to the central axis of the drilling machine (i.e. is at an angle thereto), the scaling means appears to move relative to the light field in a manner corresponding to a movement of the drilling machine away from or towards the workpiece surface. According to this relative movement of the scaling means with respect to the light field, the user can determine a change of the distance between the drilling machine and the workpiece and thus the penetration depth of the tool into the workpiece.

According to a further advantageous embodiment of the present invention it may be possible that the scaling means contains at least one first shading and one second shading on the light field. With the aid of the shadows produced, a color contrast is produced on the light field, with reference to which the user can better recognize the relative movement of the scaling means with respect to the light field on the basis of the movement of the drilling machine away from or towards the workpiece surface.

In order to ensure the best possible representation of the light field on the workpiece surface, according to a further advantageous embodiment of the present invention it may be possible that the central axis of the light source and the central axis of the drilling machine lie in one plane.

According to a further advantageous embodiment of the present invention it may be possible that the scaling means can be produced at least on one edge of the light field. In this way the center or the central area of the light field remains unaffected by the scaling means, so that the light field can be used primarily for illumination of the area of the workpiece surface which is being processed by the user with the drill. Thus, furthermore, the light source or the light field generated by the light source can be used as working illumination.

Further advantages can be seen from the following description of the figures. Various exemplary embodiments of the present invention are illustrated in the drawings. The drawings, the description and the claims contain numerous features in combination. A person skilled in the art will also advantageously consider the features individually and produce further sensible combinations thereof.

BRIEF DESCRIPTION OF THE SEVERAL VIEWS OF THE DRAWING(S)

In the drawings the same and equivalent components are provided with the same reference signs. In the drawings:

FIG. 3 shows a plan view of the device according to the invention for determining a penetration depth into a workpiece according to a first embodiment;

FIG. 4 shows a plan view of the device according to the invention for determining a penetration depth into a workpiece according to a second embodiment;

FIG. 7 shows a further side view of the drilling machine with the device according to the invention for determining a penetration depth into a workpiece together with the light spot generated by the light source on the workpiece surface at a first distance of the drilling machine from the workpiece surface;

FIG. 8 shows a further side view of the drilling machine with the device according to the invention for determining a penetration depth into a workpiece together with the light spot generated by the light source on the workpiece surface at a second distance of the drilling machine from the workpiece surface;

FIG. 9 shows a representation of the light spot generated by the light source on the workpiece surface according to a first distance of the drilling machine from the workpiece surface;

FIG. 10 shows a representation of the light spot generated by the light source on the workpiece surface according to a second distance of the drilling machine from the workpiece surface;

FIG. 11 shows a representation of the light spot generated by the light source on the workpiece surface according to a third distance of the drilling machine from the workpiece surface;

FIG. 12 shows a representation of the light spot generated by the light source on the workpiece surface according to a second embodiment;

FIG. 13 shows a representation of the light spot generated by the light source on the workpiece surface according to a third embodiment; and FIG. 14 shows a representation of the light spot generated by the light source on the workpiece surface according to a fourth embodiment.

DETAILED DESCRIPTION OF THE INVENTION

Figure 1:
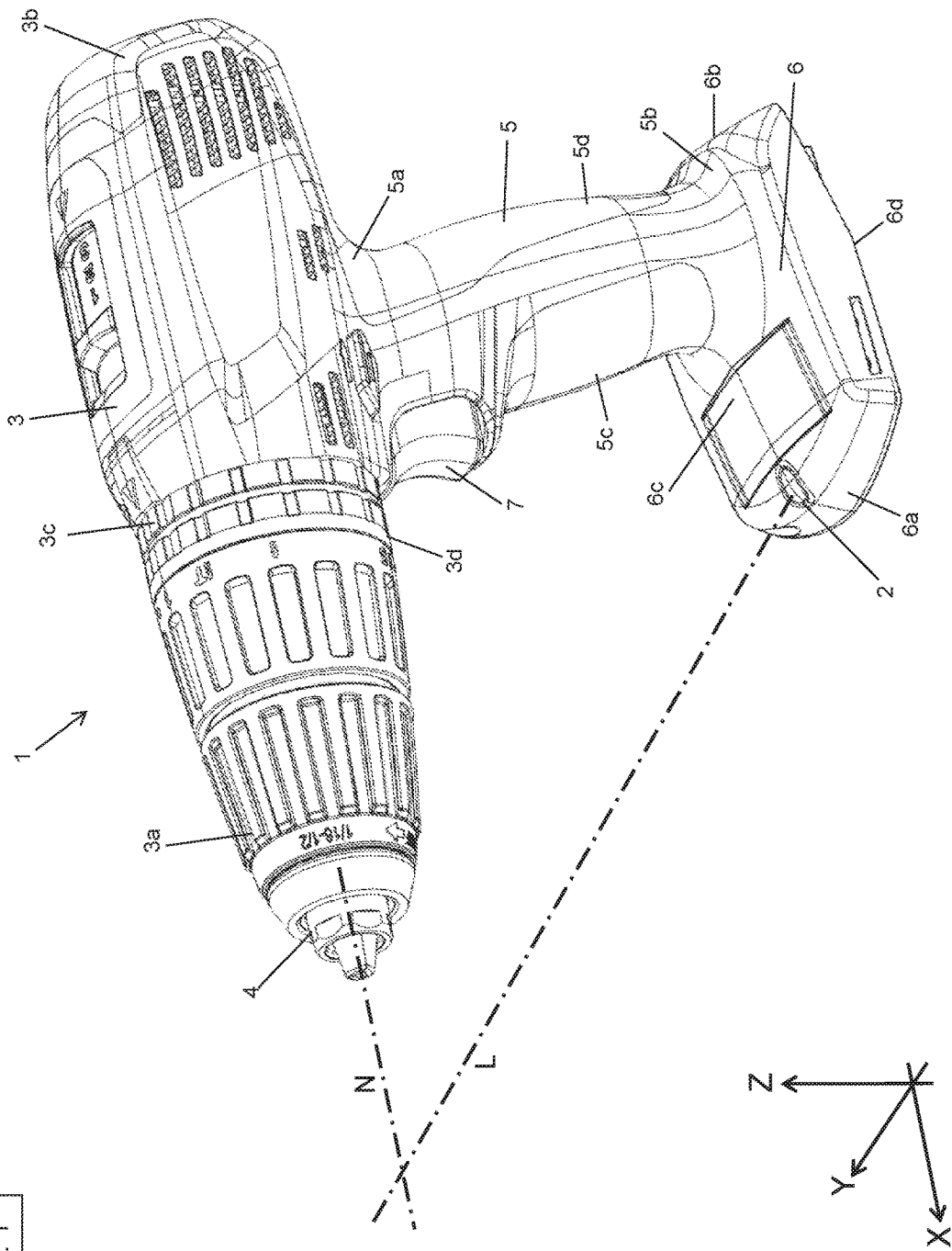
FIG. 1 shows a perspective view of a drilling machine with a device according to the invention for determining a penetration depth into a workpiece.

FIG. 1 shows a first perspective view of a drilling machine 1 with a device 2 according to the invention for determining a penetration depth of a drill (not shown) into a workpiece W.

The drilling machine 1 primarily includes a housing 3, a tool holder 4, a handle 5 and a base part 6.

Figure 2:
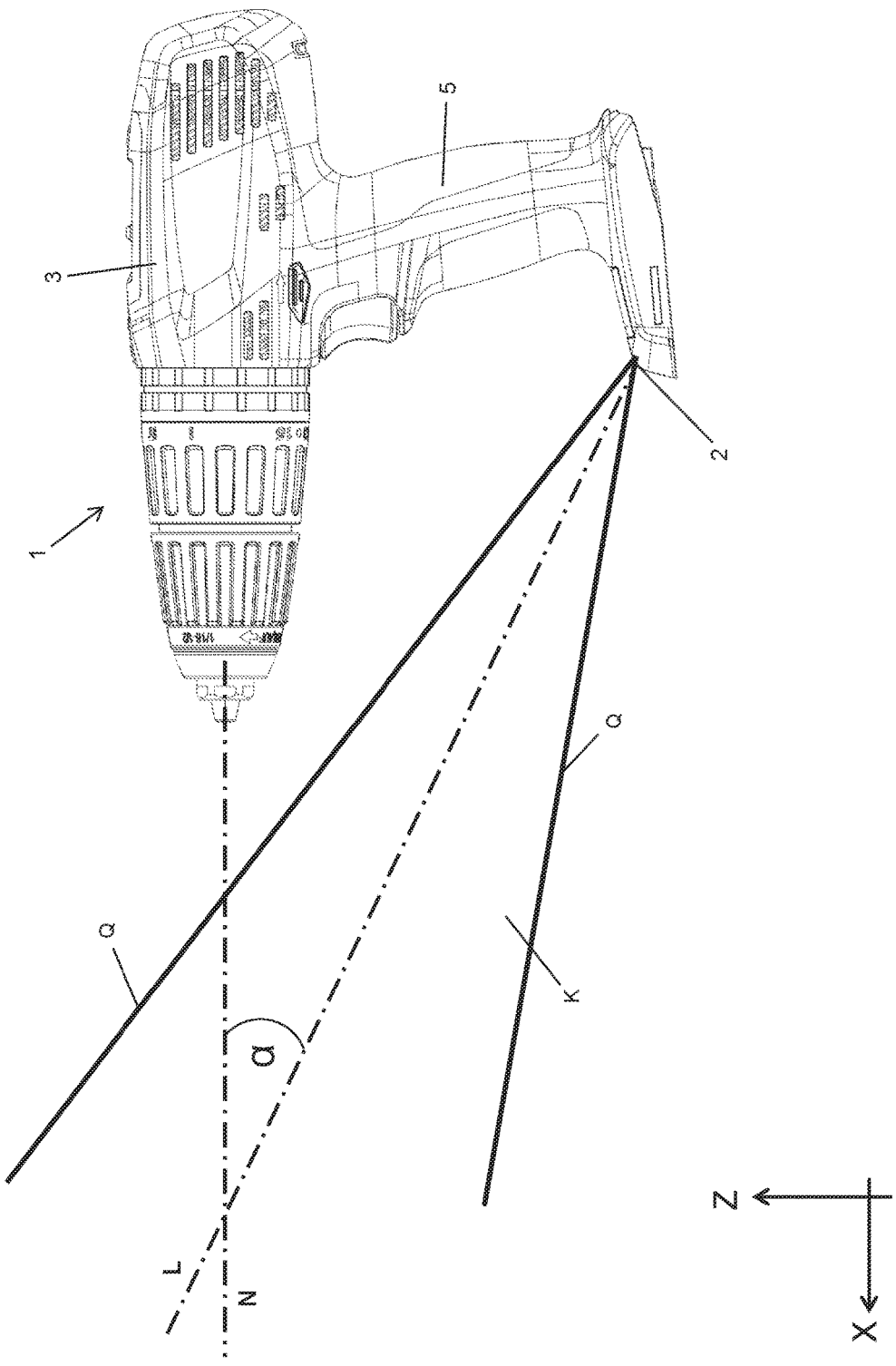
FIG. 2 shows a side view of the drilling machine with a device according to the invention for determining a penetration depth into a workpiece.

The housing 3 comprises a front end 3a, a rear end 3b, an upper face 3c and a lower face 3d. The tool holder 4 is positioned on the front end 3a. A drill (so-called drill bit) (not shown) can be accommodated and retained with the aid of the tool holder 4. A central axis N extends in the direction X through the housing 3 and also through the tool holder (cf. FIGS. 1, 2 and 6).

The handle 5 comprises a first end 5a, a second end 5b, a front face 5c and a rear face 5d. As shown in FIG. 1, the handle 5 is fastened with the first end 5a to the lower face 3d of the housing 3.

The base part 6 comprises a front end 6a, a rear end 6b, an upper end 6c and a lower end 6d. The base part 6 is fastened with the upper end 6c to the second end 5b of the handle 5 and extends primarily in the direction X.

With the aid of the base part 6 a battery can be connected to the drilling machine 1 for power supply. The battery is not shown in the drawings. On the front face of the handle 5 there is positioned a switch 7 by which the drilling machine 1 can be switched on and off and the output of the drilling machine 1 can be regulated.

A device 2 for determining a penetration depth in a drilled hole which is drilled into a workpiece W from a workpiece surface W0 with a drill of the drilling machine 1 is positioned on the upper end 6c and close to the front end 6a of the base part 6.

Figure 5:
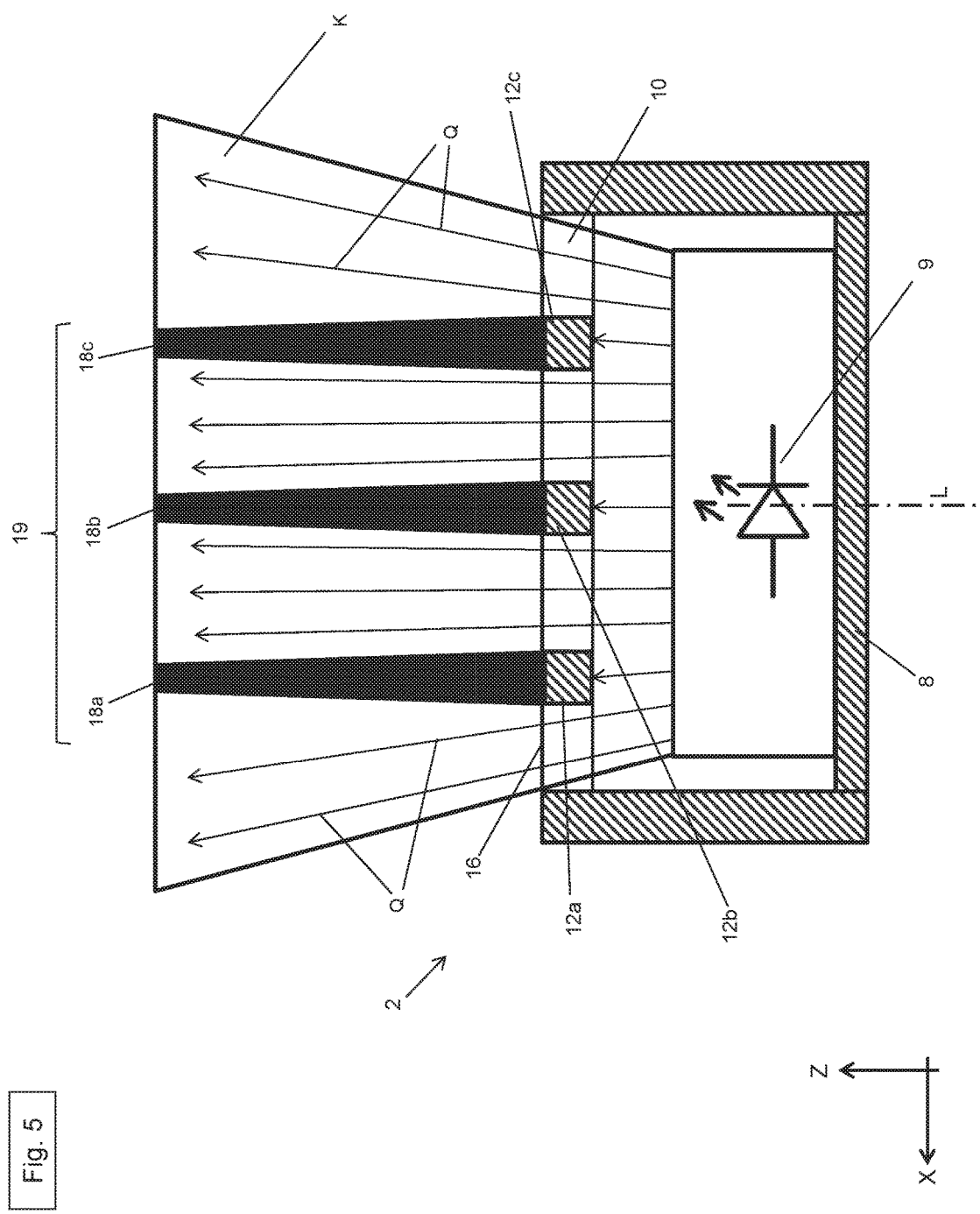
FIG. 5 shows a side view of the device according to the invention for determining a penetration depth into a workpiece according to the first embodiment.

As shown in FIGS. 3, 4 and 5, the device 2 for determining a penetration depth mainly comprises a housing 8, a light source 9, a lens 10 and a first, second and third blocking element 12a, 12b, 12c.

In this case FIG. 3 shows a plan view of the device 2 for determining a penetration depth according to a first embodiment. FIG. 4 shows a plan view of the device 2 for determining a penetration depth according to a second embodiment. FIG. 5 shows a side view, in the direction Y, of the device 2 for determining a penetration depth according to the first embodiment.

As shown in particular in FIG. 5, the housing 8 of the device 2 forms a hollow space 13, in which the light source 9 is positioned. The light source 9 is configured in the form of a light-emitting diode. However, it is also possible that the light source 9 is configured in the form of one or more other illumination means. The hollow space 13 in the housing 8 is covered by the lens 10. As shown in FIG. 5, the lens 10 comprises a first side edge 10a, a second side edge 10b, a third side edge 10c and a fourth side edge 10d. The lens 10 serves to focus the light emitted by the light source 9. In this way the light emitted by the light source 9 exits from the housing 8 of the device 2 substantially in the form of a truncated cone K. Furthermore, the light source 9 has a central axis L, which extends substantially through the longitudinal axis or coaxially with respect to the longitudinal axis of the light truncated cone K (cf. FIGS. 5 and 6).

Figure 6:
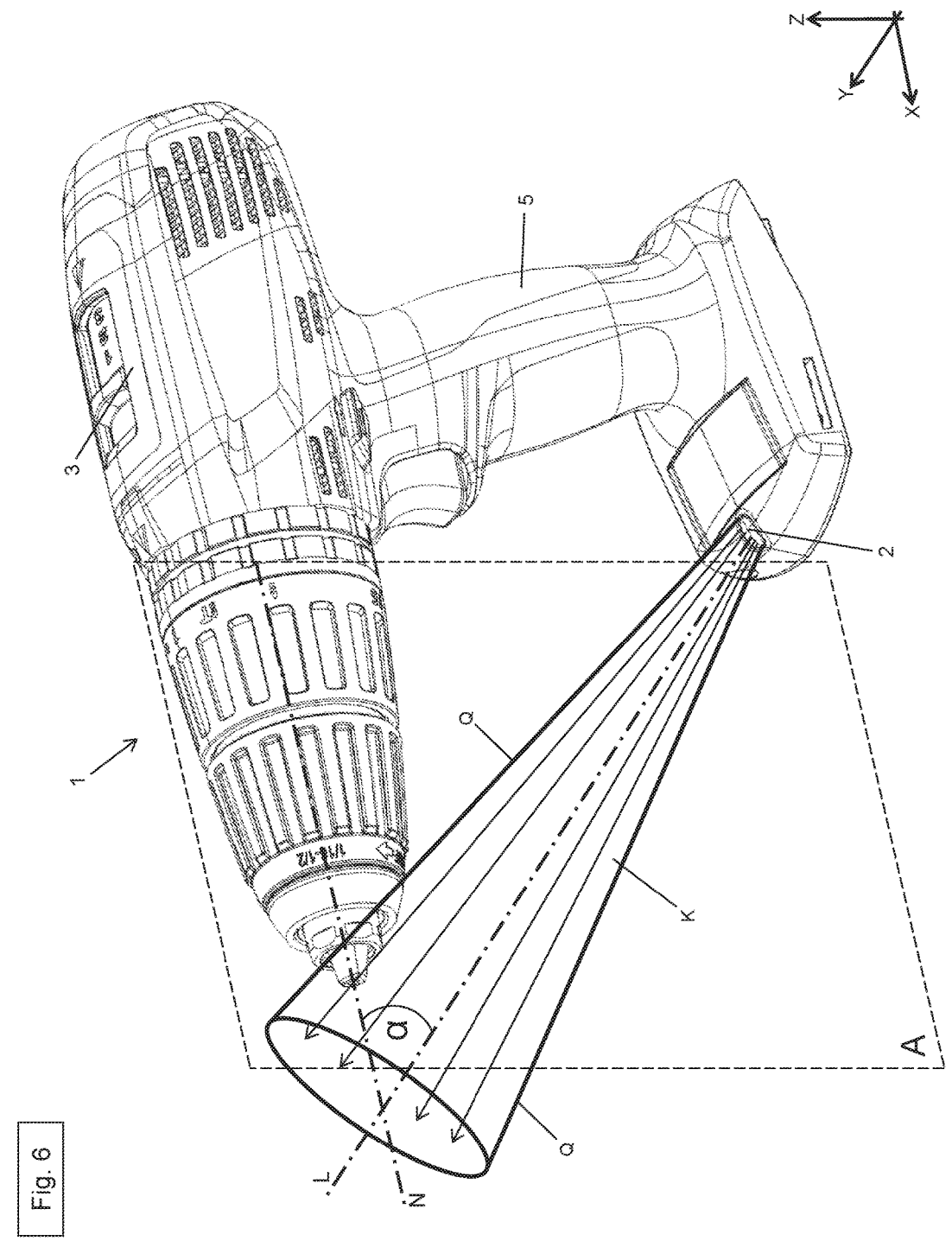
FIG. 6 shows a further perspective view of the drilling machine with a device according to the invention for determining a penetration depth into a workpiece together with a vertical plane.

As illustrated in FIG. 6, the central axis L of the light source 9 and the central axis of the housing 3 as well as the tool holder N are located on the same plane A. The plane A extends in the direction X and Z. Furthermore, the central axis L of the light source 9 and the central axis of the housing 3 as well as the tool holder N are at an angle α relative to one another.

As illustrated in FIGS. 3, 4 and 5, the first, second and third locking elements are positioned on the lens 10. According to the first embodiment, the three blocking elements 12a, 12b, 12c are in each case configured in the form of a cuboid with a triangular base surface and fastened to the first side edge 10a of the lens 10 at uniform distances relative to one another (cf. FIG. 3). In this case the three blocking elements 12a, 12b, 12c protrude, counter to the direction Y, into the lens surface 16. According to the second embodiment, the three blocking elements 12a, 12b, 12c are in each case configured in the form of an indentation in the lens surface 16 (cf. FIG. 4). According to a further embodiment (not shown), the three blocking elements 12a, 12b, 12c can also be configured in the form of an edge in the lens surface 16 and/or by grinding of the lens surface 16.

As illustrated schematically in FIG. 5, the three blocking elements 12a, 12b, 12c partially block the light Q from the light source 9 coming out of the housing 8 so that a first, a second and a third shading 18a, 18b, 18c are produced in a light field 17 generated by the light source 9. As shown in FIGS. 7 to 14, these three shadings 18a, 18b, 18c are discernible on the basis of the mutual positioning of the blocking elements 12a, 12b, 12c with a regular spacing relative to one another on the edge S of the light field 17 projected onto the workpiece surface WO. The three shadings 18a, 18b, 18c form a scaling means 19 as reference means for determining the penetration depth of a drill into a workpiece W or for determining the change of the distance of the drilling machine 1 from the workpiece surface WO.

If the drilling machine 1 with the device for determining a penetration depth or, respectively, for determining the change to the distance of the drilling machine 1 from the workpiece surface WO, is located at a first distance a from the workpiece surface (as shown in FIG. 7), a reference point R of the drilling machine 1 is approximately at the same height as the second shading 18b. The reference point R is formed by the location at which a drill impacts or will impact on the workpiece surface WO when the drilling machine 1 is moved further towards the workpiece W. The drill is not illustrated in the drawings.

If the drilling machine 1 with the device for determining a penetration depth or, respectively, for determining the change to the distance of the drilling machine 1 from the workpiece surface WO, moves towards the workpiece surface WO (i.e. in the direction X) and as a result is located at a second distance b from the workpiece surface (as shown in FIG. 8), a reference point R of the drilling machine 1 is approximately at the same height as the third shading 18c. It should be noted that the light field 17 becomes somewhat smaller because of the reduction of the distance of the drilling machine 1 from the workpiece surface WO (i.e. distance a to distance b). However, the distances of the three shading 18a, 18b, 18c relative from another remain unchanged hereby and serve as reference means.

On the basis of the change of the reference point from the second shading 18b to the third shading 18c, the user recognizes how deep the drill has penetrated into the workpiece W, since the distance of the individual shadings 18a, 18b, 18c relative to one another can be interpreted as a corresponding movement in the direction X. In this connection, for example, on the drilling machine 1 an inscription is provided, with the aid of which the user learns that a distance between two shadings (i.e. 18a to 18b or 18b to 18c) corresponds to a movement of 10 mm in the direction X. In the event of a change of the reference point from the height of the first shading 18a to the height of the third shading 18c the drilling machine 1 has moved 20 mm in the direction X.

FIGS. 9 to 11 show the light field 17 on the workpiece surface WO, wherein the drilling machine 1 is spaced away from the workpiece W by three different distances.

The distance of the drilling machine 1 from the workpiece surface WO decreases continuously from FIG. 9 to FIG. 10.

The reference point R moves corresponding to the decreasing distance of the drilling machine 1 from the workpiece surface WO in the light field 17 in the direction Z. According to the aforementioned interpretation of the distances of the shadings 18a, 18b, 18c relative to one another (distance of shading corresponds in each case to 10 mm in the direction X), from FIG. 9 to FIG. 10 the drilling machine 1 has moved by 5 mm towards the workpiece surface WO. From FIG. 10 to FIG. 11 the drilling machine 1 has moved by a further 5 mm towards the workpiece surface WO. From FIG. 9 to FIG. 11 the drilling machine 1 has moved by 10 mm towards the workpiece surface WO.

FIG. 12 shows a representation of the light spot 17 generated by the light source 9 on the workpiece surface WO according to a second embodiment. In this case the blocking elements 12a, 12b, 12c are in each case configured in the form of a cuboid with a trapezoidal base surface, so that the shadings 20 produced thereby in the light field 17 are illustrated in trapezoidal form.

FIG. 13 shows a representation of the light spot 17 generated by the light source 9 on the workpiece surface WO according to a third embodiment. In this case the blocking elements 12a, 12b, 12c are in each case configured in the form of a cuboid with a rectangular base surface, so that the shadings 21 produced thereby in the light field 17 are illustrated in rectangular form.

FIG. 14 shows a representation of the light spot 17 generated by the light source 9 on the workpiece surface WO according to a fourth embodiment. In this case the blocking elements 12a, 12b, 12c are in each case configured in the form of a cuboid with a rectangular base surface. In contrast to the third embodiment, however, according to the fourth embodiment the blocking elements 12a, 12b, 12c extend over the entire lens surface 16 of the light source 9, so that the shadings 22 produced thereby in the light field 17 are illustrated in lines.

The invention claimed is:

1. A device for determining a penetration depth in a drilled hole drilled into a workpiece from a workpiece surface (WO) with a drill of a drilling machine, the drilling machine having a central axis (N); the device comprising:
   at least one light source for projecting a light field onto the workpiece surface (WO),
   the light source comprising a central axis (L), and at least one blocking element for partially covering the light source and forming a reference on the light field for determining the penetration depth of the drilled hole from the workpiece surface, wherein the light source is positioned with respect to the drilling machine so that the central axis (L) of the light source extends at an angle ($\alpha$) to the central axis (N) of the drilling machine.

2. The device according to claim 1, wherein the reference contains a first shading and a second shading on the light field.

3. The device according to claim 2, wherein the central axis (L) of the light source and the central axis (N) of the drilling machine lie in one plane (A).

4. The device according to claim 3, wherein the reference can be generated at least partially on one edge (S) of the light field.

5. The device according to claim 2, wherein the reference can be generated at least partially on one edge (S) of the light field.

6. The device according to claim 1, wherein the central axis (L) of the light source and the central axis (N) of the drilling machine lie in one plane (A).

7. The device according to claim 6, wherein the reference can be generated at least partially on one edge (S) of the light field.

8. The device according to claim 1, wherein the reference can be generated at least partially on one edge (S) of the light field.

* * * * *